United States Patent

[11] 3,568,168

[72] Inventor William J. Neuman
Burnsville, Minn.

[21] Appl. No. 552,742
[22] Filed May 25, 1966
[45] Patented Mar. 2, 1971
[73] Assignee Fabri-Tek Incorporated
Edina, Minn.

[54] MEMORY APPARATUS
21 Claims, 6 Drawing Figs.

[52] U.S. Cl. .......... 340/174
[51] Int. Cl. .......... G11c 7/00, G11c 11/06, G11c 5/02
[50] Field of Search .......... 340/174 (M)

[56] References Cited

UNITED STATES PATENTS

| | | | |
|---|---|---|---|
| 3,181,131 | 4/1965 | Pryor et al. | 340/174 |
| 3,209,337 | 9/1965 | Crawford | 340/174 |
| 3,303,481 | 2/1967 | Kessler | 340/174 |
| 3,319,233 | 5/1967 | Amemiya et al. | 340/174 |

*Primary Examiner*—Stanley M. Urynowicz, Jr.
*Attorney*—Lew Schwartz

ABSTRACT: A two-wire coincident current selection system for magnetic cores arranged in columns and rows with adjacent cores having 90° angles relative to one another. A separate column winding threads each of the cores in each column and a separate row winding threads each of the cores in each row. The row windings are joined together in pairs and are connected at one end to output signal means, and are connected to current source means such that current can be selectively sent in either direction through a selected pair of row windings. The sense of the threading by the column and row windings is such that, with respect to the two cores in every column threaded by a joined pair of row windings, the row and column windings aid each other in a first of the cores and buck each other in a second of the cores.

INVENTOR.
WILLIAM J. NEUMANN
BY Braddock & Burd
ATTORNEYS

INVENTOR.
WILLIAM J. NEUMANN
BY Braddock & Burd
ATTORNEYS

INVENTOR.
WILLIAM J. NEUMANN
BY
Braddock & Burd
ATTORNEYS

MEMORY APPARATUS

This invention is concerned with memory apparatus, and more particularly with a two-wire coincident current selection system for a mass memory array of toroidal magnetic storage elements.

The use of magnetic memory arrays is well-known in the contemporary art of data handling equipment. Such arrays generally comprise a plurality of bistable magnetic storage elements, such as toroidal magnetic cores. The cores are placed in columns and rows, commonly with adjacent cores at 90° angles to each other, and the cores are wound or threaded with various windings. The windings may include a column winding and a row winding which must be coincidentally energized to provide enough current to switch the state of a selected core in the corresponding row and column location. Another winding, such as a sense winding, may be strung through various cores to sense the change in state of a selected core. This sense winding is connected to some form of sense amplifier for detecting the signal in the sense line. In some systems, an inhibit line will also be used, to prevent switching of certain selected cores under certain circumstances.

The apparatus of this invention is a two-wire system. That is, each core in the array is threaded or wound with only a column or $X$ winding, and a row or $Y$ winding. The result is a comparatively low-cost core selection system, suitable for large mass memories.

Briefly described, the apparatus of this invention comprises a plurality of magnetic arrays of toroidal magnetic cores in rows and columns as described above. A separate column winding threads each of the cores in each column, and a separate row winding threads each of the cores in each row. The row windings are joined together in pairs at a first end, and a center-tapped primary winding of a transformer is connected between the other ends of each pair of row windings. The sense of the threading by the column and row windings is such that, with respect to the two cores in every column threaded by a joined pair of row windings, the row and column windings aid each other in a first of the cores and buck each other in a second of the cores. The common junction of the joined pair of row windings is selectively connected to either a current source or a current sink, as is the center-tap of the primary winding connected between the pair of row windings. Thus current can be sent in either selected direction, simultaneously, through a pair of row windings. Apparatus is also provided for directing a current in either direction through the column winding. Thus proper selection of the direction of currents through the pair of row windings and a column winding will cause selection of the proper core. Because the sense of the pair of row windings and column windings is such that the column and row windings thread cores in the same column in the same sense in a first core and in opposite senses in a second core, either one, but only one, of the two cores will be selected.

In the apparatus of this invention the row windings are used as the sense windings. When no change of state occurs due to current through a pair of row windings, the net current through the center-tapped primary winding will be substantially zero, to effectively give no signal to the secondary of the transformer. When one of the pair of row windings receives a signal due to the switching of a core, a net current will flow through the center-tapped primary winding, and an output signal will be produced.

Another feature of the apparatus of this invention is the sense signal amplification apparatus used to detect a signal formed on the center-tapped primary winding. Briefly described, this sense signal amplification apparatus comprises a plurality of preamplifier devices. Each preamplifier device has a number of input terminals, adapted to be connected to the secondary windings of the transformer associated with the center-tapped primary winding which senses the change of state of a core. The number of secondary windings connected to each preamplifier is less than the total number of secondary windings in the memory apparatus. The input terminals are connected within the preamplifier such that when connected across the secondary windings, the secondary windings are connected in series circuit, preferably with each winding in bucking relation to its adjacent winding in the series circuit. The series connected windings are then connected to amplification means which amplifies a signal produced by one of the windings and presents it to an output. All of the preamplifier outputs are connected to a main sense amplifier input. Thus each preamplifier handles sense signals from a number of sense lines less than the total number of sense lines, to reduce the amount of noise in the sense signal. Yet only a single sense amplifier for each group of preamplifiers is needed to provide the desired output signal.

Figure 1:
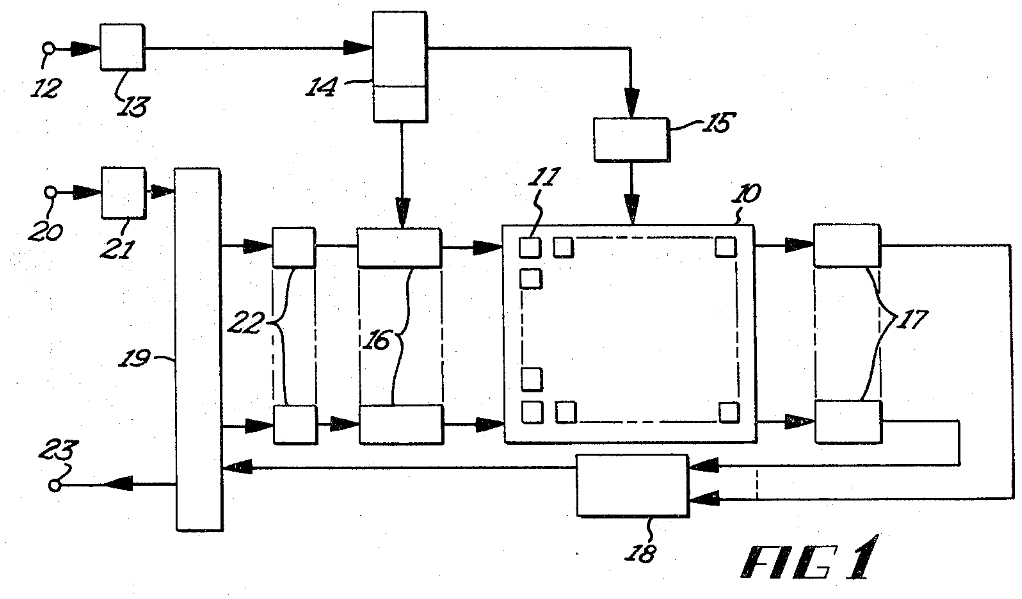
FIG. 1 is a block diagram of a mass memory system embodying the apparatus of this invention.

Referring first to FIG. 1 there is shown a block diagram of a typical mass memory system which can embody the apparatus of this invention. There is shown a memory stack 10 on which are mounted a plurality of arrays 11 of magnetic storage elements, such as toroidal magnetic cores. Address forming apparatus (not shown) provides a plurality of signals on address line terminals such as terminal 12. The signals then pass through a plurality of gates such as 13, to set an address register 14. Signals from a first portion of register 14 pass to column or $X$ selection logic block 15 to select a particular column or $X$ winding. Signals from another portion of register 14 pass to a plurality of $Y$ selection logic blocks such as 16, to provide current to a particular connected pair of row or $Y$ windings. If a read operation is being performed, the change of state of a selected core will be sensed in one of a plurality of preamplifiers such as 17. The sensed signal will then proceed from preamplifier 17 to a sense amplifier 18, mixed with a strobe signal (not shown) and then passed on to a data register 19. As desired, the data is then presented to a plurality of data line output terminals such as 23. If a write operation is desired, data is provided to a plurality of data line terminals such as 20, passed through a plurality of gates such as 21, and placed in data register 19. The data then passes through the proper ones of a plurality of write control logic blocks 22, and then into row or $Y$ selection logic block 16.

Figure 2:
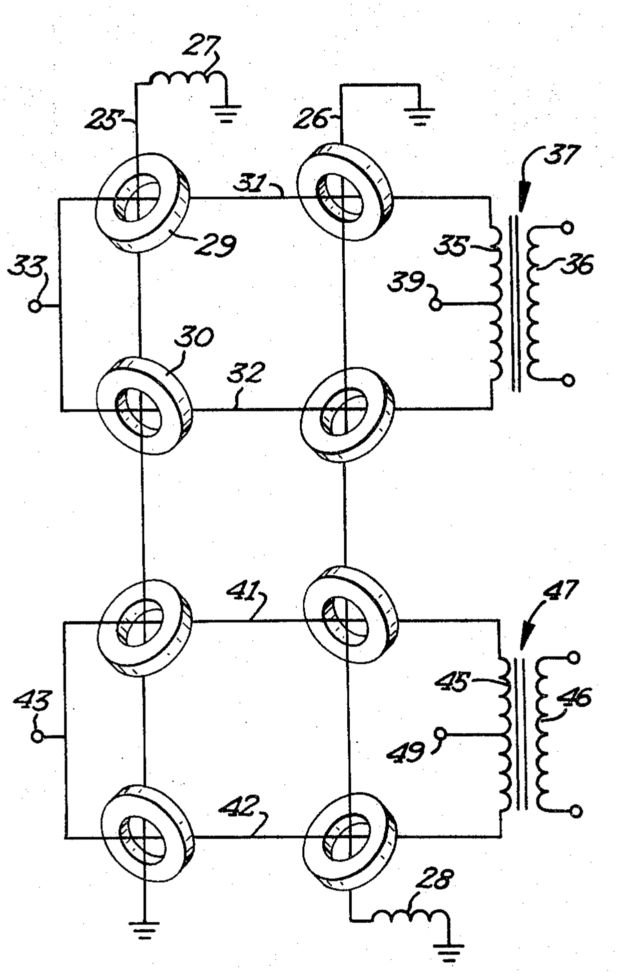
FIG. 2 is a schematic representation of the core selection and sensing method of the apparatus of this invention.

Referring now to FIG. 2, the driving and sensing apparatus of this invention may be more easily described. In FIG. 2 there are shown a plurality of magnetic cores such as 29 and 30 arranged in rows and columns. A column or $X$ winding 25 threads each of the cores in a first column. One end of $X$ winding 25 is connected to ground, while the other end is connected through a winding 27 to ground. $X$ drive current may be presented to winding 27 to provide current in either direction through winding 25. Another column or $X$ winding 26 threads each of the cores in the second column, and similarly has one end connected to ground and another end connected through a winding 28 to ground.

A row or $Y$ winding 31 threads each of the cores in a first row, while a row or $Y$ winding 32 threads each of the cores in a second row. Each of windings 31 and 32 has a first end connected to a common terminal 33. Terminal 33 is adapted to be selectively connected to a current source or a current sink, as will be more fully described below. A transformer 37 has a center-tapped primary winding 35 connected between the other ends of windings 31 and 32. Center-tap 39 on winding 35 is also adapted to be selectively connected to a current source or a current sink. A signal on winding 35 will appear on a secondary winding 36 of transformer 37, which is adapted to be connected to sense signal amplification apparatus, as described below..

In FIG. 2 there is also shown another pair of row or *Y* windings 41 and 42, each threading all the cores in a separate row. Windings 41 and 42 are connected at one end to a common terminal 43, which is also adapted to be selectively connected to a current source or a current sink. A transformer 47 has a primary winding 45 connected between the other ends of *Y* windings 41 and 42. A center-tap 49 on winding 45 is also adapted to be selectively connected to a current source or current sink. A secondary winding 46 on transformer 47 is adapted to be connected to sense signal amplification apparatus.

To best understand the operation of the apparatus of FIG. 2, it should be noted that the column and row windings are such that, for example, in core 29 *X* winding 25 and *Y* winding 31 thread core 29 in the same sense, while core 30 is strung in the opposite senses by *X* winding 25 and row winding 32. Assuming now that terminal 33 is connected to a current source, and center-tap 39 is connected to a current sink, current will simultaneously flow through each of row windings 31 and 32, through the respective upper and lower halves of winding 35, and through center-tap 39 to the current sink. Assume also that a signal has been impressed on winding 27 such that current flows downwardly through *X* winding 25. The current provided in the row windings and *X* windings is such that they must coincidentally be present to effect switching of a core from one state to another. Thus it can be seen that no change of state of core 30 is possible because the currents are in bucking relation. However, the currents through core 29 are in the same direction, and will switch core 29, assuming it was in the opposite state to that selected.

If core 29 does switch, the signal will be felt on *Y* winding 31 and thus on primary winding 35. Thus a signal will be produced which will be felt on secondary 36 to be presented to the sense signal amplification apparatus. If no switching of core 29 occurs, that is if it was already in the selected state, there would be no additional signal on winding 31.

Assuming again the first situation, where core 29 had been switched to readout, a rewrite can be accomplished by simply switching the direction of current in both the *X* and *Y* winding connected with the selected core. That is, current would be provided upwardly through winding 25, terminal 33 would be connected to a current sink and center-tap 39 would be connected to a current source. Again, the currents through core 29 would be additive, but now in the opposite sense, to reset core 29. The current through core 30 would be bucking to have no effect. A signal would again be felt on transformer 37, but would not be detected because no strobe pulse (described below) would be presented to the sense signal amplification apparatus.

From the above description of FIG. 2, it is apparent that any usual read or write operation can be performed on any selected core in an array with the use of selected bipolar current through an *X* winding and a corresponding pair of *Y* windings. Because of the simultaneous provision of current to a pair of row windings such as 31 and 32, it is preferable to start current through the pair of *Y* windings before starting the coincident current through the *X* winding to allow a noise decay delay period. This timing can best be seen with reference to FIG. 3 in which curve A represents the current through a selected pair of *Y* windings, curve B represents a signal for the turnon of the input to the sense signal amplification apparatus, curve C represents the current through the *X* winding, curve D represents the signal sensed on secondary winding such as winding 36, and curve E represents a strobe signal for a turnon of the output of the sense signal amplification apparatus.

It will be apparent from curves A and D that the turnon of current in the *Y* windings causes noise to appear across secondary winding 36. By turning on the current in the corresponding *X* winding at a later time. As seen in curve C, the noise will have substantially decayed before the desired output signal S is provided. By turning on the sense signal amplification apparatus at the time indicated in curve B, some of the undesirable noise will enter the sense signal amplification apparatus. However, by strobing the apparatus at the time indicated in curve E, the output from the sense signal amplification apparatus will appear only at the time of the desired signal S.

Figure 4:
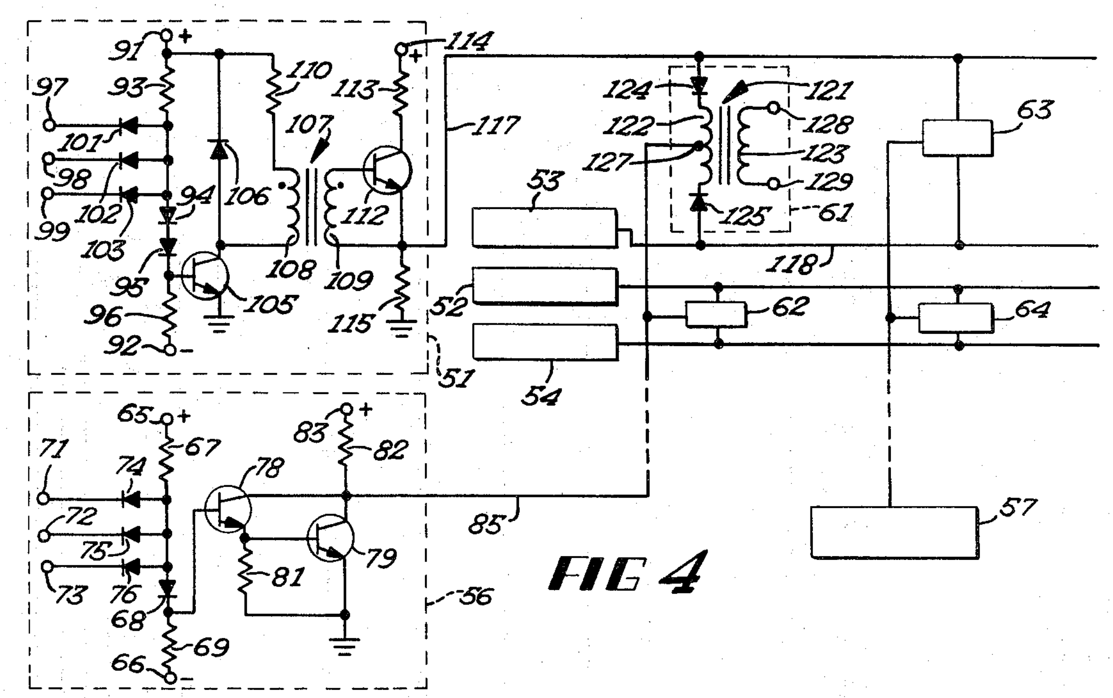
FIG. 4 is a schematic and block diagram representation of the column selection apparatus of this invention.

Referring now to FIG. 4, there is shown the apparatus used for the selection of the proper current through the proper column or *X* winding. In FIG. 4 there are shown a plurality of read current drivers such as 51 and 52, a plurality of write current drivers such as 53 and 54, a plurality of selector switches such as 56 and 57, and a plurality of column or *X* winding drivers such as 61, 62, 63 and 64. The circuit to be described for read current driver 51 is the same circuit used in all read current drivers as well as in all write current drivers such as 53 and 54. The circuit to be described in selector switch 56 is the same circuit as that used in all selector switches, and the circuit to be described in column winding driver 61 is the same as is in all column winding drivers.

The circuitry which comprises read current driver 51 will now be described. This circuitry is the same as that of all read current drivers, such as 51 and 52, as well as all write current drivers, such as 53 and 54. Within the dotted lines comprising driver 51 there are shown a pair of terminals 91 and 92. Terminal 91 is adapted to be connected to a positive source of energy, while terminal 92 is adapted to be connected to a negative source of energy. Serially connected between terminals 91 and 92 are, sequentially, a resistor 93, a diode 94, a diode 95 and a resistor 96. There are also shown a plurality of terminals 97, 98 and 99. These terminals are adapted to receive signals from an address register, such as register 14 of FIG. 1. Terminals 97, 98 and 99 are connected to a point between resistor 93 and diode 94 by, respectively, a diode 101, a diode 102 and a diode 103. There is also shown a transistor 105, which has an emitter connected to ground, a base connected to a point between diode 95 and resistor 96, and a collector connected through a diode 106 to terminal 91. There is also shown a transformer 107 having a primary winding 108 and a secondary winding 109. Primary winding 108 and resistor 110 are serially connected between the collector of transistor 105 and terminal 91. There is also shown another transistor 112. Secondary winding 109 is connected between the base and emitter of transistor 112. The collector of transistor 112 is connected through a resistor 113 to a terminal 114 adapted to be connected to a positive source of energy. The emitter of transistor 112 is also connected through a resistor 115 to ground. A line 117 is connected to the emitter of transistor 112 to carry the output signal from driver 51.

The first stage of current driver 51 performs a logical NAND function. The output of transistor 105 following the NAND operation, is transformer coupled through transformer 107 to transistor 112, which acts as an amplifier to provide an amplified signal on line 117. Preferably, the inherent droop of transformer 107 is adjusted so that the base of transistor 112 is driven with sufficient reverse current to obtain a fast turnoff at the termination of the input pulse appearing on terminals 97, 98 or 99.

The circuitry within the dotted lines that makes up selector switch 56 will now be described. This circuitry is the same as that which appears in all selector switches, such as 56 and 57. There is shown a pair of terminals 65 and 66. Terminal 65 is adapted to be connected to a positive source of energy, while terminal 66 is adapted to be connected to a negative source of energy. Serially connected between terminals 65 and 66 are, sequentially, a resistor 67, a diode 68, and a resistor 69. There are shown a plurality of terminals 71, 72 and 73. These terminals are also adapted to receive signals from an address register such as register 14 of FIG. 1. Terminals 71, 72 and 73 are connected to a point between resistor 67 and diode 68 by, respectively, a diode 74, a diode 75 and a diode 76. There are also shown a pair of transistors 78 and 79. The base of transistor 78 is connected to a point between diode 68 and resistor 69. The emitter of transistor 78 is connected to the base of transistor 79. The emitter of transistor 78 is also connected through a resistor 81 to ground, and the emitter of transistor 79 is connected directly to ground. The collectors of both transistors 78 and 79 are connected through a resistor 82 to a terminal 83 adapted to be connected to a positive source of energy. The collectors of transistors 78 and 79 are also connected to an output line 85. The circuitry described above for selector switch 56 also acts as a high gain NAND circuit. The collector of transistor 79 must be able to sink the current generated by a current driver such as 51 or 52.

The circuitry in column winding driver 61 will now be described. The circuitry is the same for all column winding drivers, such as 61, 62, 63 and 64. There is shown a transformer 121 having a primary winding 122 and a secondary winding 123. Secondary winding 123 is connected between a pair of terminals 128 and 129, adapted to be connected to a column or *X* winding. Primary winding 122 has one end connected through a diode 124 to output line 117 of driver 51. The other end of primary winding 122 is connected through another diode 125 to an output line 118 of driver 53. A center-tap 127 on primary winding 122 is connected to output line 85 of selector switch 56.

In operation, a selector switch, such as 56 is enabled by the presence of signals on terminals 71, 72 or 73, to in turn enable a plurality of column winding drivers such as 61 and 62. Thus center-tap 127 is selected to receive current from either the upper or lower portion of primary winding 122. Assuming now that read current driver 51 is enabled by the presence of signals at terminals 97, 98 and 99, current will flow through output line 117, diode 124, the upper half of winding 122, center-tap 127 and out through line 85 to selector switch 56. This current flow will cause a signal to be felt in a first direction across winding 123, to provide current in a first direction through the selected column or *X* winding.

Assuming now that read current driver 53 is turned on rather than write current driver 51, a current will flow through output line 118, diode 125, the lower half of winding 122, center-tap 127, and through line 85 to selector switch 56. This will cause a signal in the opposite direction on winding 123 to drive current in the other direction through a column or *X* winding. Thus by proper enabling of a selector switch and a current driver, current can be run in either direction through any selected column winding.

Figure 5:
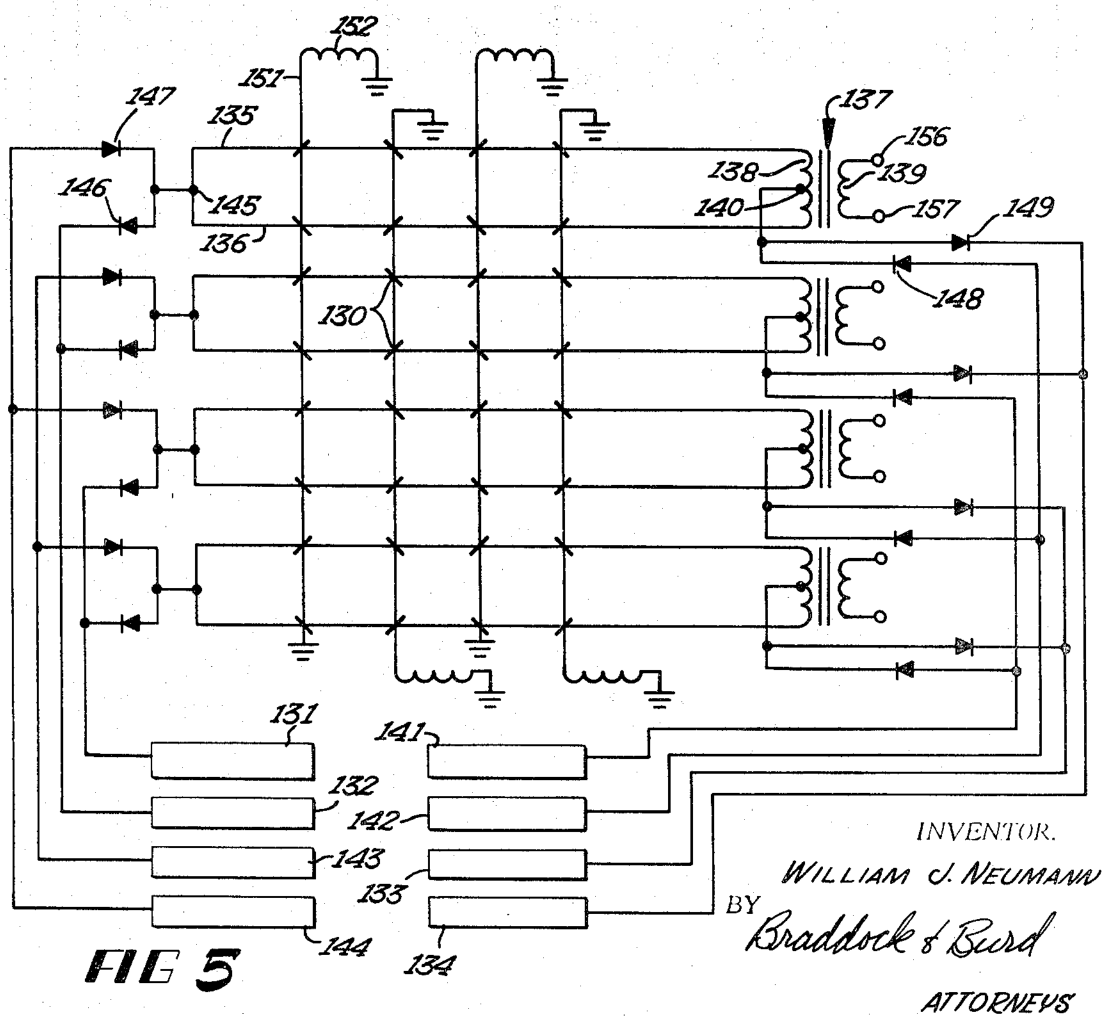
FIG. 5 is a schematic and block diagram representation of the row selection matrix of the apparatus of this invention.

Referring now to FIG. 5, there is shown a matrix for the selection of a desired pair of row or *Y* winding. The particular matrix may take any one of a number of forms, and is not limited to the 2 × 2 matrix shown in FIG. 5. In FIG. 5 there are shown a plurality of current sink selectors such as 131, 132, 133 and 134. There are also shown a plurality of current source drivers such as 141, 142, 143 and 144. A plurality of magnetic cores 130 are arranged in an array of columns and rows. Each column is threaded by a column or *X* winding such as 151. Each column winding such as 151 has one end connected to ground and another end connected through an input winding such as 152 to ground. Each row is threaded by a row or *Y* winding such as 135 and 136. The sense of the threading of cores 130 is that as described in the discussion above of FIG. 2. One end of each of windings 135 and 136 is connected to a common junction 145, while a primary winding 138 of a transformer 137 is connected between the other ends of winding 135 and 136. Common junction 145 is connected through a diode 146 to a current sink selector 132. Diode 146 is poled to permit the flow of current from junction 145 to allow current to flow from junction 145 through diode 146 to current sink selector 132. Junction 145 is also connected through a diode 146 to a current source driver 144. Diode 147 is poled to permit the flow of current from driver 144 to junction 145. A center-tap 140 on primary winding 138 is connected through a diode 148 to a current source driver 142. Diode 148 is poled to permit the flow of current from driver 142 to center-tap 140. Center-tap 140 is also connected through a diode 149 to a current sink selector 134. Diode 149 is poled to permit the flow of current from center-tap 140 to current sink selector 134. Thus a current source or a current sink can be selectively connected to the common junction such as 145 of a pair or row windings, as well as selectively connected to the center-tap such as 140 of the winding such as 138 connected between the other ends of each pair of row windings. Each current sink selector and each current source driver is capable of selecting or driving a plurality of pairs of row windings such as 135 and 136. The circuitry of the current sink selectors such as 131 and the current source drivers such as 141 are similar to the circuitry described above for read current drivers such as 51 and selector switches such as 56. However, they are able to handle twice the current because they must drive or select two row windings at a time. Many designs well-known in the art can be used for such circuitry.

Assume now that selector 132 and driver 142 are enabled. Current will then flow from driver 142 through diode 148, through center-tap 140 of winding 138, through both halves of winding 138, through each of row windings 135 and 136 to common junction 145, through diode 146, and into selector 132. If no core is switched, the signals across the upper and lower halves of winding 138 will substantially cancel, as described above in the discussion of FIG. 2, and no output will appear on a secondary winding 139 of transformer 137. If however a core does switch, a signal will appear, as described in the above discussion of FIG. 2, and a signal will appear across winding 139. This signal will be connected through a pair of terminals 156 and 157 to a preamplifier such as 17 shown in FIG. 1. Of course this assumes the presence of current in a selected column winding such as 151.

Assuming it is now desired to drive current in the other direction through row windings 135 and 136, then current source driver 144 can be enabled along with current sink selector 134. Then current will flow from driver 144 through diode 147, through common junction 145, to divide equally between row windings 135 and 136, through the upper and lower halves of winding 138 to center-tap 140, through diode 149 and into selector 134. Again, an output signal on secondary winding 139 will be present only if a core switches due to a coincident current flowing in a column winding such as 151. From FIG. 5 it can be seen that a simple matrix can be used to provide current in the proper direction through any pair of selected row windings.

Figure 6:
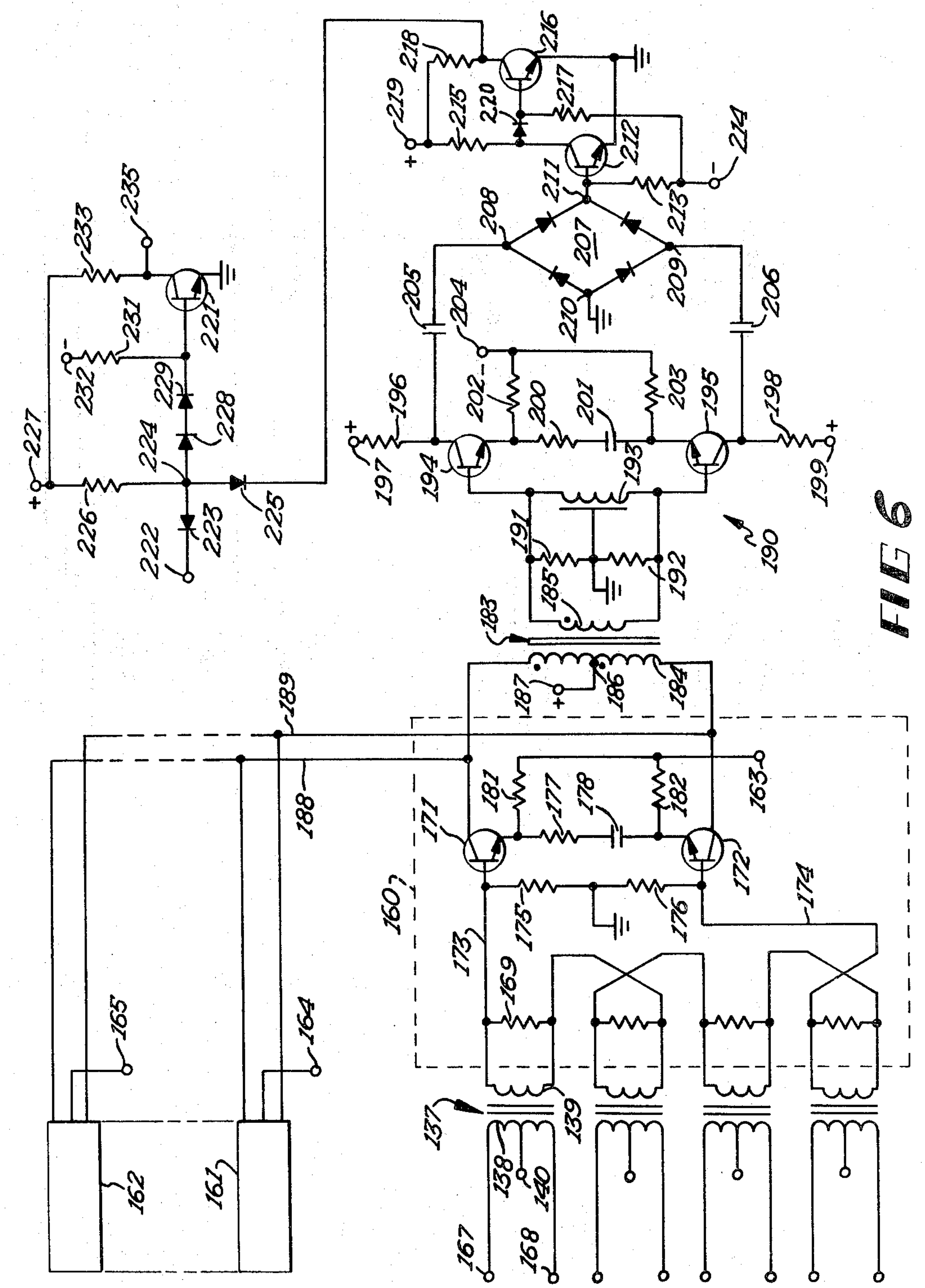
FIG. 6 is a schematic and block diagram representation of the sense signal amplification apparatus of this invention, including preamplifier apparatus and sense amplifier apparatus.

Referring now to FIG. 6 there is shown the circuitry for the sense signal amplification apparatus of this invention, including the circuitry for a plurality of preamplifiers such as 160, 161 and 162, as well as the main sense amplifier 190. The circuitry contained in preamplifier 160 will now be described. This circuitry is the same as that which appears in the plurality of preamplifiers, such as 161 and 162. It will first be noted that each preamplifier has a preamplifier select terminal such as 163, 164 and 165. These terminals are adapted to be connected to selection apparatus (not shown) for the turnon of the proper preamplifier. Because, as will be described below, all of the preamplifiers have their outputs connected to a single sense amplifier, it is desirable to enable only the preamplifier from which a sense signal will be available. This eliminates excess noise signals at the input to the main sense amplifier.

In FIG. 6 it can be seen that a plurality of secondary windings such as 139 of transformer 137 are connected across input terminals to preamplifier 160. Thus the signal appearing across secondary windings such as 139, due to the presence of a difference between the current flow in the upper and lower halves of primary winding 138, as described in the discussion of FIG. 5, will be felt in preamplifier 160. For purposes of clarity, row windings have not been shown, and it will be understood that a pair of terminals such as 167 and 168 at each end of each primary winding such as 138 are connected to a row winding.

It will be noted that across each secondary winding such as 139 there is connected a resistor such as 169. Also, each of the secondary windings connected to a preamplifier such as 160 is interconnected with all the other secondary windings entering the same preamplifier in series circuit. In the embodiment shown in FIG. 6, and preferably, the series connected secondary windings are in bucking relation to further eliminate unwanted noise signals.

There are also shown a pair of transistors 171 and 172. The series connected secondary windings such as 139 are connected between the bases of transistors 171 and 172. Also connected between the bases of transistors 171 and 172 are a pair of series connected resistors 175 and 176. A point between resistors 175 and 176 is connected to ground. Serially connected between the emitters of transistors 171 and 172 are a resistor 177 and a capacitor 178. The emitter of transistor 171 is connected through a resistor 181 to preamplifier select terminal 163. The emitter of transistor 172 is connected through a resistor 182 to terminal 163. The output from preamplifier 160 is accomplished by connecting a primary winding 184 of a transformer 183 between the collectors of transistors 171 and 172. Similarly, the outputs of all preamplifiers such as 161 and 162 are connected across primary winding 184, such as by lines 188 and 189. A center-tap 186 on primary winding 184 is connected to a terminal 187 adapted to be connected to a positive source of energy. Thus the outputs of each of preamplifiers such as 160, 161 and 162 will be felt on a secondary winding 185 of transformer 183, to be coupled to the main sense amplifier 190. A pair of resistors 191 and 192 are serially connected to winding 185. A junction between resistors 191 and 192 is connected to ground. A delay line 193 is connected across series connected resistors 191 and 192, and delay line 193 also has a point connected to ground. There is also shown in sense amplifier 190 a pair of transistors 194 and 195. Delay line 193 is connected between the bases of transistors 194 and 195. The collector of transistor 194 is connected through a resistor 196 to a terminal 197 adapted to be connected to a positive source of energy. The collector of transistor 195 is connected through a resistor 198 to a terminal 199 adapted to be connected to a positive source of energy. A serially connected resistor 200 and capacitor 201 are connected between the emitters of transistors 194 and 195.

Figure 3:
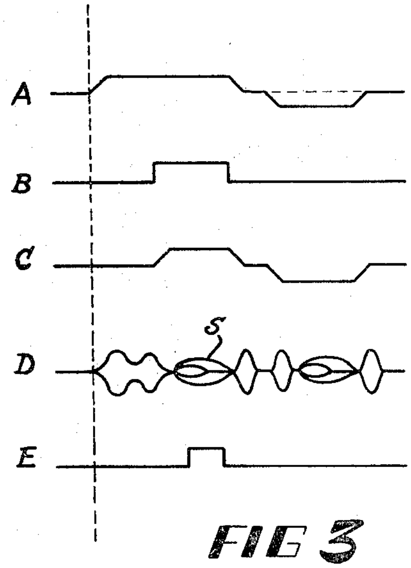
FIG. 3 is a timing chart of various signals used in the driving and sensing apparatus of this invention.

There is also shown a diode bridge 207, having a pair of input terminals 208 and 209, and a pair of output terminals 210 and 211. The collector of transistor 194 is connected through a capacitor 205 to terminal 208. The collector of transistor 195 is connected through a capacitor 206 to terminal 209. Terminal 210 is connected to ground. Terminal 211 is connected to the base of a transistor 212. The base of transistor 212 is also connected through a resistor 213 to a terminal 214 adapted to be connected to a negative source of energy. The collector of transistor 212 is connected through a resistor 217 to a terminal 219 adapted to be connected to a positive source of energy. The emitter of transistor 212 is connected to ground. The collector of transistor 212 is connected through a diode 220 to the base of a transistor 216. The base of transistor 216 is connected through a resistor 217 to terminal 214. The emitter of transistor 216 is connected to ground. The collector of transistor 216 is connected through a resistor 218 to terminal 219. The collector of transistor 216 is also connected through a diode 225 to a junction 224. Junction 224 is connected through a resistor 226 to a terminal 227 adapted to be connected to a positive source of energy. Junction 224 is also connected through a pair of series connected diodes 228 and 229 to the base of a transistor 221. The base of transistor 221 is connected through a resistor 231 to a terminal 232 adapted to be connected to a negative source of energy. The emitter of transistor 221 is connected to ground. The collector of transistor 221 is connected through a resistor 233 to terminal 227. Junction 224 is also connected through a diode 223 to a strobe input terminal 222. Strobe input terminal 222 is adapted to receive a signal which enables output transistor 221 of sense amplifier 190 at a predetermined time such as is shown in the curves of FIG. 3. (The strobing apparatus is now shown).

The apparatus of the drawing of FIG. 6 indicates the amount of circuitry intended to be used for each bit position in the memory stacks such as stack 10 of FIG. 1. Thus each sense amplifier 190 must connect to a plurality of row windings. This is achieved by the use of a plurality of preamplifiers, the number of which is less than the total number of row windings. The row windings are connected to the preamplifiers by the use of one transformer for each pair of row windings, the secondary windings of the transformer being connected in series to the differential preamplifiers. Each preamplifier is selected by proper decoding of the address register such as register 14 of FIG. 1, and because only one preamplifier is selected, only the noise from the row windings entering that preamplifier will be presented to the main sense amplifier 190. The amplifier within each preamplifier is transformer coupled to the main sense amplifier 190, through transformer 183. Noise presented on various row windings to amplifier 190 at the time the row winding current is generated (see FIG. 3) as well as any imbalance in the collector currents of transistors 171 and 172 of the preamplifier such as 160, may cause a voltage level shift in amplifier 190. Because this level shift changes the threshold of amplifier 190, it is preferable that amplifier 190 return to the quiescent level before application of the actual core sense signal. This is accomplished through delay line 193 connected between the bases of transistors 194 and 195. A step voltage, such as would be caused by unequal currents flowing in the pair of selected row windings, appears at the input to amplifier 190 only during the down-and-back time of delay line 193. No further voltage due to imbalance appears across delay line 193 until the step voltage is turned off (see FIG. 3). Thus, a signal superimposed on the DC level appears at the input to sense amplifier 190 referenced to ground level, and the threshold of amplifier 190 is not changed during strobe time. The down-and-back time of delay line 193 must be sufficient so that a major portion of the signal passes through amplifier 190. After passing through transistor 194 and 195, the signal is rectified by diode bridge 207, amplified and inverted by transistors 212 and 216, and AND gated with a strobe pulse at the input to transistor 221. The output of transistor 221 appears at an output terminal 235 to set a flip-flop in a data register such as data register 19.

It can thus be seen that the apparatus described above provides a large memory array served by a single set of electronics, which reduces the cost-per-bit of the memory circuitry. Therefore, increased memory capacity is available, without the undesirable large cost previously required to expand memories by increasing the number of storage modules.

Though various preferred circuitry has been described above to best explain the operation of the apparatus of this invention, it should be understood that many other forms can be used without departing from the spirit of the invention contained herein.

I claim:

1. In a magnetic memory for data processing apparatus, the memory including a plurality of toroidal magnetic storage elements arranged in columns and rows, the improved coincident current winding means for the columns and rows comprising:

a plurality of column windings, one of said column windings threading each of the elements in the columns;

a plurality of row windings having first and second ends, one of said row windings threading each of the elements in the rows;

said pair of row windings threading elements in the same column, respectively, in the same and opposite sense as said column winding;

said first ends of said row windings connected in separate pairs to separate common terminals;

a plurality of signal means, one of said signal means connected between said second ends of each of said separate pairs of row windings;

means for selectively connecting s source of current across said column windings; and means for selectively connecting current source means and current sink means to said common terminals and said signal means for selectively providing current in either direction through said row windings.

2. The apparatus of claim 1 in which said separate pairs of windings comprise row windings in adjacent rows.

3. The apparatus of claim 1 including timing means connected to said source of current, said current source means and said sink means, for delaying the start of current flow through said column winding with respect to said row winding.

4. The apparatus of claim 1 in which said signal means comprise:

transformer means including a center-tapped input winding and an output winding;

said input windings connected between said second ends of each of said separate pairs of row windings; and said center-taps connected to said means for selectively connecting said current source means and said current sink means to said signal means.

5. The apparatus of claim 4 in which said column windings and said pairs of row windings thread elements in the same columns in the same sense in a first element and in opposite senses in a second element.

6. In a coincident current magnetic memory including a plurality of bistable toroidal magnetic cores arranged in rows and columns, adjacent cores in the rows and columns having their planar surfaces at substantially 90° to each other, the improvement comprising:

a plurality of column windings, each of said column windings threading all of the cores in one of the columns;

first means for selectively connecting current source means to said column windings for selectively providing current therethrough;

a plurality of row windings, each of said row windings threading all of the cores in one of the rows, adjacent row windings threading adjacent cores in each column, respectively, in the same and opposite sense as said column winding;

second means interconnecting one end of adjacent row windings to form pairs of adjacent row windings;

a plurality of center-tapped windings;

third means connecting one of said center-tapped windings between the other ends of each of said pairs of adjacent row windings;

fourth means for selectively connecting said center-tap to current source means and current sink means;

fifth means for selectively connecting said second means to current source means and current sink means; and sixth means coupled to said center-tapped winding for sensing signals therefrom due to switching of a core.

7. The apparatus of claim 6 including timing means; and means connecting said timing means to said first, fourth and fifth means for delaying current flow in said column windings with respect to the start of current flow in said row windings.

8. The apparatus of claim 6 in which said fourth means includes a pair of oppositely poled asymmetric current conducting means, each having one end connected to said center-tap and another end connected, respectively, to current source means and current sink means; and said fifth means includes a pair of oppositely poled asymmetric current conducting means each having one end connected to said second means and another end connected, respectively, to current source means and current sink means.

9. Memory apparatus comprising:

a plurality of bistable toroidal magnetic elements arranged in columns and rows;

a plurality of column windings, one of said column windings threading all of said elements in each column;

a plurality of row windings, one of said row windings threading all of said elements in each row, said row windings threading adjacent elements in each column, respectively, in the same and opposite sense as said column winding;

first means for simultaneously providing current through one of said column windings and an adjacent pair of said row windings, for coincident current selection of one of said elements; and second means connected between said adjacent pair of row windings, for sensing selection of one of said elements.

10. The apparatus of claim 9 in which said second means includes:

a center-tapped winding connected between said adjacent pair of row windings;

said center-tap connected to said first means; and output means inductively coupled to said center-tapped winding.

11. The apparatus of claim 9 in which said first means includes:

diode matrix means connected from current source means and current sink means to said adjacent pair of row windings and said second means, for selectively providing current therethrough in a selected direction.

12. In memory apparatus including a plurality of bistable toroidal magnetic cores arranged in rows and columns, the improved coincident current core selection apparatus comprising:

a plurality of column windings, one of said column windings threading all of said cores in each column;

a plurality of row windings, one of said row windings threading all of said cores in each row, said row windings threading adjacent elements in each column, respectively, in the same and opposite sense as said column winding;

a plurality of transformer means including primary and secondary windings;

means serially connecting a pair of adjacent row windings and one of said primary windings in a closed electrical loop, said primary winding connected between said pair of row windings at one end of said loop;

means selectively connecting a current source and a current sink to a center-tap on said primary winding and to said pair of row windings at the other end of said loop, for selectively providing current in either direction through said loop; and means selectively connected to said column windings, for providing current therethrough.

13. The apparatus of claim 12 including preamplifier means comprising; a plurality of input terminals and output means, connecting said input terminals to a plurality of said secondary windings so that said secondary windings are connected in series; amplification means and means connecting said amplification means between said serial connected secondary windings and said output means.

14. The apparatus of claim 13 including a plurality of said preamplifiers; a sense amplifier having sense input means and a sense output terminal and means connecting said output means of said plurality of preamplifiers to said sense input means.

15. The apparatus of claim 13 in which:

said serial connected secondary windings are connected in bucking relation.

16. In memory apparatus in which a matrix of bistable magnetic cores arranged in rows and columns are threaded with column windings and row windings, and a plurality of transformers have a primary winding connected to respective row windings for sensing the change in state of a core, the sensed change appearing on a secondary winding of the transformers; the improved sense signal amplification apparatus comprising:

a plurality of preamplifier means each having a number of input terminals less than the plurality of secondary windings and having output means;

means connecting said input terminals to selected ones of the secondary windings so that the selected secondary windings are connected in series circuit;

amplifier means in each of said preamplifier means connected between said series connected secondary windings and said output means;

a sense amplifier; and means connecting each of said output means to said sense amplifier.

17. The apparatus of claim 16 in which: said selected secondary windings connected in series circuit are connected in bucking relation.

18. The apparatus of claim 16 including: selection means connected to each of said amplifier means for selectively enabling said preamplifier means.

19. The apparatus of claim 16 in which said means connecting each of said output means to said sense amplifier comprises:

transformer means including first and second windings;

means connecting said first winding across each of said output means; and means connecting said second winding across a pair of input terminals on said sense amplifier.

20. The apparatus of claim 19 in which said amplifier means comprise:

a pair of transistors having emitter, collector and base electrodes;

means connecting said series connected selected secondary windings between said base electrodes;

means connecting said base electrodes to one terminal of a source of energy;

means connecting said emitter electrodes;

selection means connected to said emitter electrodes for selectively enabling said preamplifier means;

means connecting said transformer means first winding between said collector electrodes; and center-tap means on said first winding connected to another terminal on the source of energy.

21. The apparatus of claim 20 in which said sense amplifier includes delay line means connected between said pair of input terminals on said sense amplifier; and further amplifier means connected to said delay line means.

PO-1050
(5/69)

UNITED STATES PATENT OFFICE
CERTIFICATE OF CORRECTION

Patent No. 3,568,168 Dated March 2, 1971

Inventor(s) William J. Neuman

It is certified that error appears in the above-identified patent and that said Letters Patent are hereby corrected as shown below:

Column 7, Line 52, "217" should be --215--.
Column 9, Line 7, after "including" insert --:--;

Line 53, after "including" insert --:--;
Line 57, after "which" insert --:--;

Column 10, Line 46, after "output means," delete comma (,) and insert --; means--;
Line 48, after "means (first occurrence) insert --;--;
Line 51, after "including" insert --:--.
Column 12, Line 15, after "includes" insert --:--.

Signed and sealed this 31st day of August 1971.

(SEAL)
Attest:

EDWARD M.FLETCHER,JR.
Attesting Officer

WILLIAM E. SCHUYLER, JR.
Commissioner of Patents

UNITED STATES PATENT OFFICE

CERTIFICATE OF CORRECTION

Patent No. 3,568,168 Dated March 2, 1971

Inventor(s) William J. Neumann

It is certified that error appears in the above-identified patent and that said Letters Patent are hereby corrected as shown below:

Column 9, line 21, after "which" insert -- : --; line 53, after "including" insert -- ; --.

Signed and sealed this 11th day of April 1972.

(SEAL)
Attest:

EDWARD M.FLETCHER,JR.
Attesting Officer

ROBERT GOTTSCHALK
Commissioner of Patents